(12) United States Patent
Park

(10) Patent No.: US 8,181,640 B2
(45) Date of Patent: May 22, 2012

(54) PORTABLE COOKING SYSTEM

(76) Inventor: Jun-Gyu Park, Busan (KR)

( * ) Notice: Subject to any disclaimer, the term of this patent is extended or adjusted under 35 U.S.C. 154(b) by 460 days.

(21) Appl. No.: 12/480,632

(22) Filed: Jun. 8, 2009

(65) Prior Publication Data

US 2009/0301463 A1 Dec. 10, 2009

(30) Foreign Application Priority Data

Jun. 9, 2008 (KR) .................. 10-2008-0053613
Jun. 9, 2008 (KR) .................. 10-2008-0053614

(51) Int. Cl.
*A47J 27/02* (2006.01)

(52) U.S. Cl. ............... 126/376.1; 126/220; 126/369; 126/384.1; 126/39 D; 99/446; 99/447; 99/473; 99/481

(58) Field of Classification Search ............ 126/220, 126/369, 376.1, 384.1, 39 D; 99/446, 447, 99/473, 481
See application file for complete search history.

(56) References Cited

U.S. PATENT DOCUMENTS

| | | | | |
|---|---|---|---|---|
| 684,423 A * | 10/1901 | Gellenbeck | ............ | 126/381.1 |
| 800,069 A * | 9/1905 | Brown et al. | ............ | 126/369 |
| 1,439,041 A * | 12/1922 | Turner | ............ | 431/335 |
| 1,456,238 A * | 5/1923 | Ivancic | ............ | 126/275 R |
| 1,711,631 A * | 5/1929 | Burnett | ............ | 126/369 |
| 1,758,571 A * | 5/1930 | Hager | ............ | 126/275 R |
| 2,093,013 A * | 9/1937 | Jennings | ............ | 99/440 |
| 2,428,894 A * | 10/1947 | Serio | ............ | 220/231 |
| 2,483,069 A * | 9/1949 | Snook | ............ | 126/376.1 |
| 2,511,682 A * | 6/1950 | Allen | ............ | 126/384.1 |
| 2,882,811 A * | 4/1959 | Kass | ............ | 99/312 |
| 3,088,393 A * | 5/1963 | Huckabee | ............ | 99/340 |
| 3,301,172 A * | 1/1967 | Longo et al. | ............ | 99/446 |
| 4,053,295 A * | 10/1977 | Miyauchi | ............ | 65/62 |
| 4,091,956 A * | 5/1978 | Vecchio | ............ | 220/231 |
| 4,298,131 A * | 11/1981 | Saito et al. | ............ | 220/231 |
| 4,430,559 A * | 2/1984 | Rabay | ............ | 219/449.1 |
| 4,539,899 A * | 9/1985 | Schmitt | ............ | 99/347 |
| 4,694,816 A * | 9/1987 | Fabbro | ............ | 126/41 R |
| 4,728,778 A * | 3/1988 | Choi et al. | ............ | 219/438 |
| 5,125,393 A * | 6/1992 | Levitin | ............ | 126/376.1 |
| 5,365,833 A * | 11/1994 | Chen | ............ | 99/447 |
| 5,481,967 A * | 1/1996 | Chen | ............ | 99/446 |
| 5,595,108 A * | 1/1997 | Sheu | ............ | 99/425 |
| 5,682,873 A * | 11/1997 | Chambers | ............ | 126/275 R |

(Continued)

FOREIGN PATENT DOCUMENTS

DE 3225358 A1 * 1/1984

*Primary Examiner* — Kenneth Rinehart
*Assistant Examiner* — Jorge Pereiro
(74) *Attorney, Agent, or Firm* — IPLA P.A.; James E. Bame

(57) ABSTRACT

A portable cooking system comprising a base tray, a grill plate, a lid, and a reflector is provided. The base tray comprises a heating through hole and a basin provided at a bottom of the base tray. The grill plate comprises a central opening, a substantially annular surface, and a plurality of drain holes in the annular surface. The reflector of an upturned bowl shape comprises a reflecting bump, radial furrows, and radial ridges alternatively disposed between the radial furrows, and the reflector is attached to a ceiling of the lid. Some of the radial furrows and the radial ridges are disposed on an inner surface of the upturned bowl shape, such that the heating airflow that rise upward through the heating through hole and hit a center portion of the reflector are guided outwardly to reach evenly over to the grill plate.

18 Claims, 12 Drawing Sheets

U.S. PATENT DOCUMENTS

| | | | |
|---|---|---|---|
| 5,970,858 A * | 10/1999 | Boehm et al. | 99/446 |
| 6,125,738 A * | 10/2000 | Poister | 99/339 |
| 7,059,240 B2 * | 6/2006 | Kim | 99/339 |
| 2004/0250690 A1 * | 12/2004 | Restis et al. | 99/403 |
| 2005/0205577 A1 * | 9/2005 | Park | 220/367.1 |
| 2006/0011192 A1 * | 1/2006 | Citrynell et al. | 126/25 R |

* cited by examiner

PORTABLE COOKING SYSTEM

CROSS REFERENCE

This application claims foreign priority under Paris Convention and 35 U.S.C. §119 to Korean Patent Application Nos. 10-2008-0053613 filed Jun. 9, 2008 and 10-2008-0053614 filed Jun. 9, 2008 with the Korean Intellectual Property Office.

BACKGROUND OF THE INVENTION

The present invention provides a portable cooking system enabling an even grilling.

Grilling is one of many types of cooking, which can be employed to cook meats or fish. To grill meats or fish, a frypan-type or metal plate grill have been used. With such grills, since the heat propagates from the surface of the grill to the foods on the surface of the grill, the portions touching the grill were cooked first, the foods must be flipped over to cook the other sides. Such an unbalanced or partial cooking sometimes results in burning, smoking, unpleasant smelling, and even fire hazard, let alone a longer cooking time.

Some cookers have been suggested by the applicant to solve the problems as shown in FIGS. 1-3.

The cooker includes a base tray (10), a grill plate (30), and a lid (60), which is adapted to be put on a regular gas stove as shown in FIG. 1.

The base tray (10) includes a groove (14) that is lower than neighboring region around a heat transfer hole (12), in which water can be poured in to cool down the cooker or oil falling down from food stuff (70) on the grill plate (30). The grill plate (30) is set on the base tray (10) and includes a heat input hole (32) for introducing a flame coming from the heat transfer hole (12).

The lid (60) can cover the grill plate (30) selectively, so as to cook the food stuff (70) with a direct flame or conducted heat.

FIG. 2a is a perspective view showing a conventional cooker with a lie opened, and FIG. 2b is a cross-sectional view showing a conventional cooker.

The cooker in FIGS. 2a and 2b includes a reflecting bowl (80), which is assembled to the ceiling of the lid (60) and redirects, reflects, convects, and circulates flames from the heat input hole (32) like a fountain. This structure facilites cooking evenly and getting rid of smelly particles or remnants from the cooking.

The reflecting bowl (80) is assembled into the lid (60) along with a handle (61) with a bolt (B). Such bolt (B) may hold a far-infrared radiator (W) such as ceramic or elvan, such that the infrared radiation facilitates cooking of the food stuff (70) with the flames.

Furthermore, the reflecting bowl (80) may include a ceramic coating layer (81), so as to disperse the infrared radiation inside the lid (60) in every direction.

FIG. 3a is a perspective view of another conventional cooker, and FIG. 3b is a cross-sectional view of another conventional cooker.

The cooker may includes a cap (90), which is detachably attached to a bumped edge (32b) of the heat input hole (32).

The cap (90) touches the outer rim of the bumped edge (32b), and may include pleaded edge (92) for reflecting and precipitating the introduced flame like a shower, which provides a downward flame exit (92a).

Also, the cap (90) may include a concave portion (91a) on the top surface (91), on which another food stuff such as garlic and the like can be put.

The base tray (10) may further include an outer rim (15) provided around the groove (14) by bending the part outward and a plurality of pods (11) on the outer rim (15).

The grill plate (30) may include a slope toward the groove (14) and a plurality of ventilation holes (31) disposed radially and evenly such that the oil or fatty liquid drop more efficiently.

The cooker may further include a heat introducing funnel (20) with helical linear groove (21), which can be fixed to a bump (32a) in the heat input hole (32) by screws.

However, the cooker in the above still have several problems to solve.

SUMMARY OF THE INVENTION

The present invention contrives to solve the disadvantages of the prior art.

An object of the present invention is to provide a portable cooking system.

Another object of the invention is to provide a portable cooking system, in which the heating hot air is directed almost evenly over the cooking surface.

An aspect of the present invention provides a portable cooking system comprising a base tray, a grill plate, a lid, and a reflector.

The base tray comprises a heating through hole and a basin provided at a bottom of the base tray and around the heating through hole. The heating through hole is adapted for guiding heating airflow therethrough, and the basin is adapted to collect liquid falling down.

The grill plate comprises a central opening, a substantially annular surface, and a plurality of drain holes in the annular surface, and the grill plate is configured to sit tightly on the base tray.

The lid is to cover the grill plate.

The reflector of an upturned concave bowl shape comprises a reflecting bump, a plurality of radial furrows, and a plurality of radial ridges alternatively disposed between the plurality of radial furrows, and the reflector is attached to a ceiling portion of the lid.

At least some of the plurality of radial furrows and the plurality of ridges are disposed on an inner surface of the upturned concave bowl shape generally in radiating directions, such that the heating airflow that rise upward through the heating through hole and the central opening of the grill plate and hit a center portion of the reflector are guided outwardly along the generally radiating directions to reach substantially evenly over to the grill plate.

The reflector may comprise a cross-sectional profile configured for delivering the heating airflows evenly to the annular surface of the grill plate.

The cross-sectional profile of the upturned concave shape may have a locally lowest point at a center, rises as the distance from the center increases to reach a highest point about at a mid point, and falls to a lowest point at an edge.

The cross-sectional profile of the upturned concave shape may have one or more fluctuations with local minimum or maximum points.

Each of the one or more fluctuations with local minimum or maximum points may be configured to deliver the heating airflows to a different portion of the annular surface of the grill plate.

The plurality of radial furrows and radial ridges may comprise a plurality of whirlwind pattern.

The plurality of radial ridges may be distributed evenly around the center of the reflector.

The lid may comprise a metal body and a glass cover disposed on a top hole of the metal body.

The lid further may comprise a fastening ring for fixing the glass cover in the top hole.

The reflector may be attached to the lid with a mechanical fastener, and the mechanical fastener comprises: a top fastening hole provided in a center of the glass cover; a bottom fastening hole provided in the center of the reflector; a supporting plate configured to cover a portion of the glass cover and comprising an elliptical hole; an elliptical nut configured to be installed in the elliptical hole; and a bolt configured to engage the elliptical nut through the top and bottom fastening holes.

The portable cooking system may further comprise a handle. The handle may extend from a side portion of the lid toward a center of the lid, and a supporting portion of the handle may be aligned with a side portion of the lid, such that the lid stands substantially vertically on the supporting portion of the handle and the side portion of the lid.

The handle may further comprise a fixing member for attaching the handle to the side portion of the lid, a gripping portion extending toward the center of the lid, and a mechanical fastener for connecting the fixing member and the gripping portion.

The drain holes of the grill plate may be disposed concentrically and substantially evenly in an axial direction.

The drain holes may be configured to drop liquid on the grill plate down to the basin.

The base tray may comprise a plurality of ventilation holes on outer side walls.

The base tray may further comprise a plurality of auxiliary holes disposed between the basin and the heating through hole.

The plurality of ventilation holes may be disposed substantially vertically, and the plurality of auxiliary holes are disposed substantially horizontally.

The heating through hole may be fitted into the central opening of the grill plate.

In certain embodiments of the present invention, the reflector is circumferentially toothed to form outward peaks and inward troughs, wherein the outward peaks correspond to the ridges and the inward troughs correspond to the furrows.

The advantages of the present invention are: (1) the heating hot air is directed and distributed almost evenly over the cooking surface; and (2) the introduction of the ventilation holes of the base tray enables further reduction of the total height of the portable cooking system.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

FIGS. 4-8 show embodiments of the present invention.

An aspect of the present invention provides a portable cooking system comprising a base tray 10, a grill plate 20, a lid 30, and a reflector 40.

Figure 1:
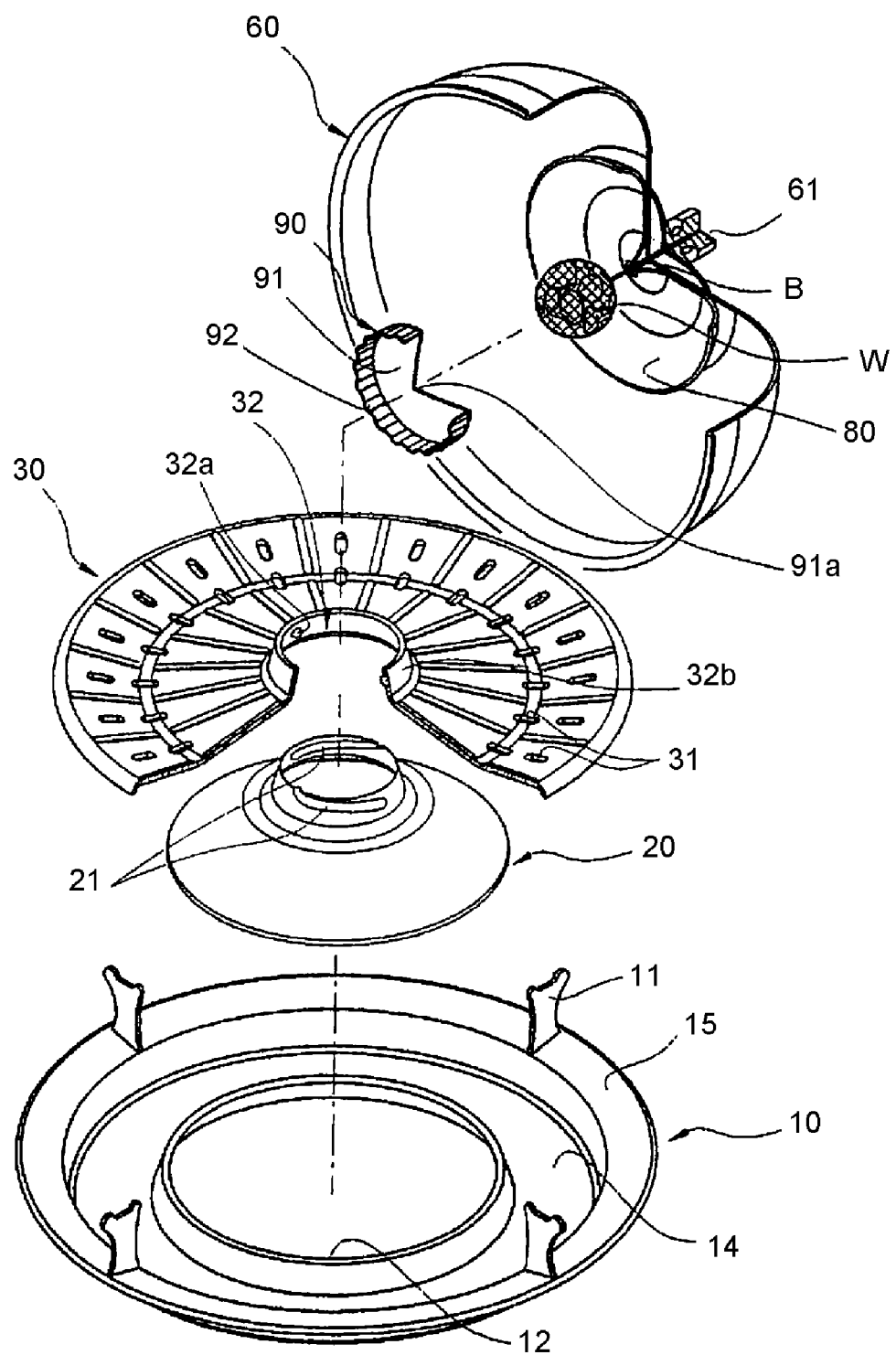
FIG. 1 is an exploded perspective view showing a conventional cooker.
Figure 2A:
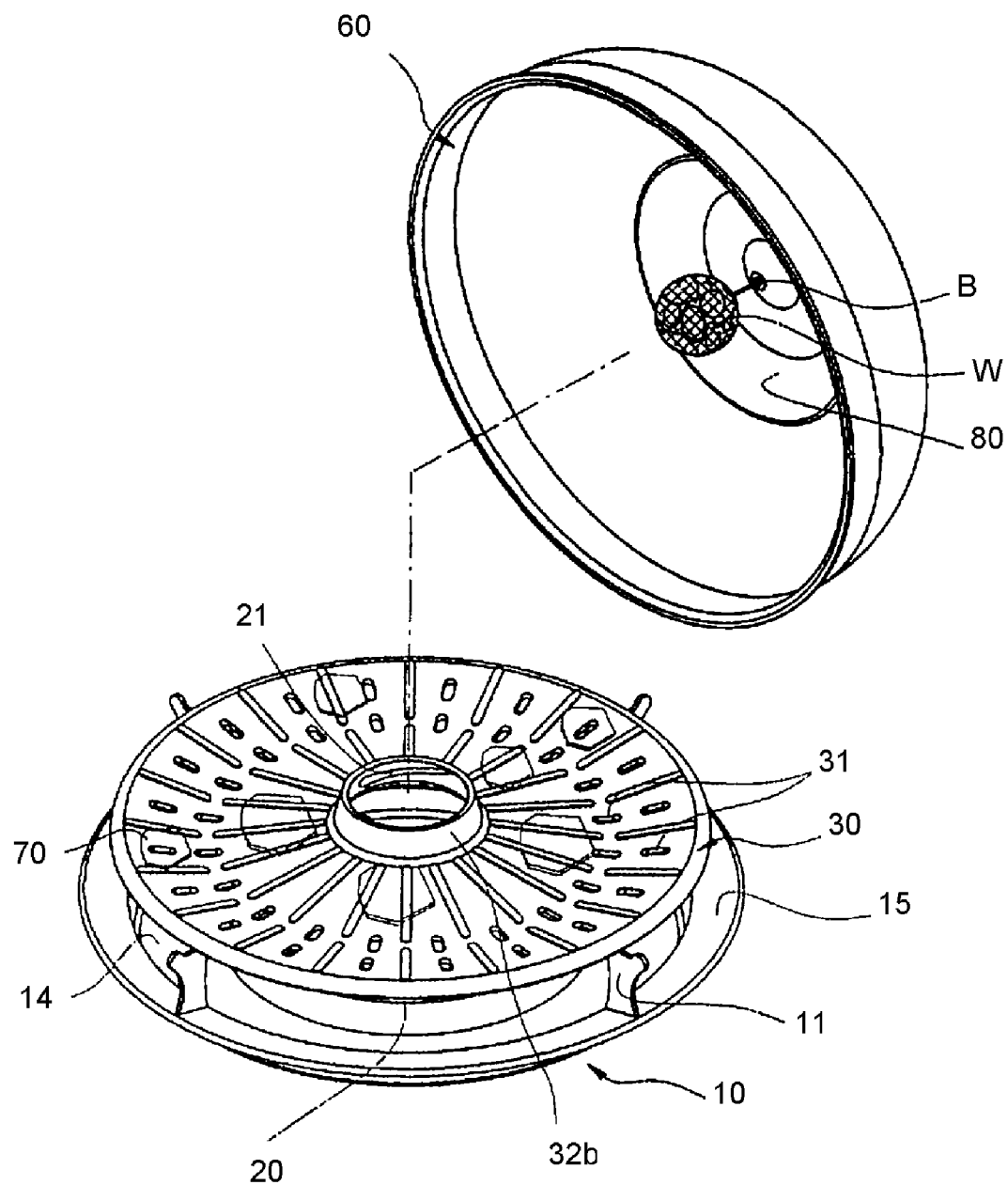
FIG. 2a is a perspective view showing a conventional cooker with a lid opened.
Figure 2B:
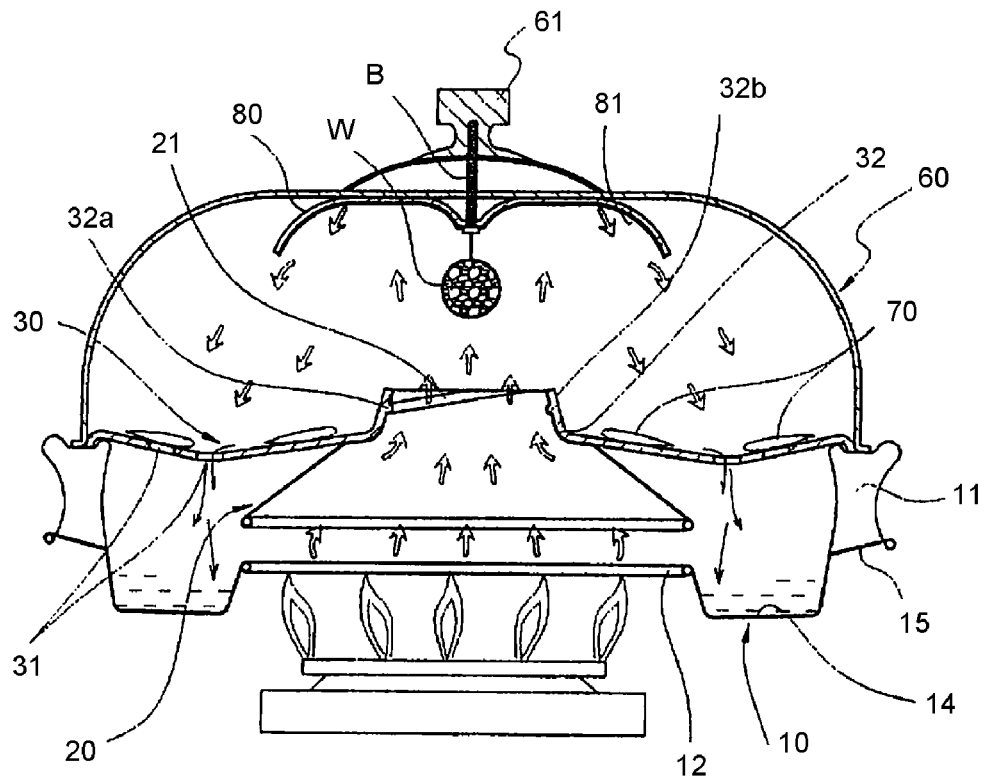
FIG. 2b is a cross-sectional view showing a conventional cooker.
Figure 3A:
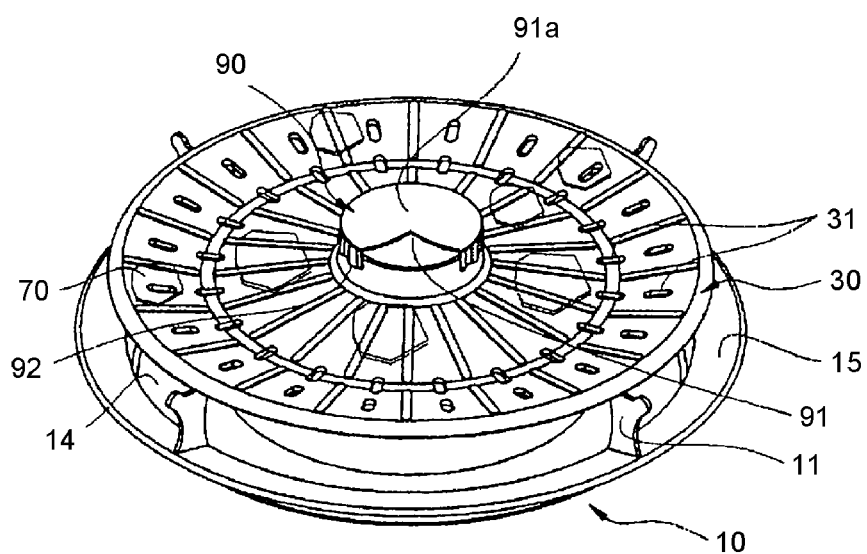
FIG. 3a is a perspective view of another conventional cooker.
Figure 3B:
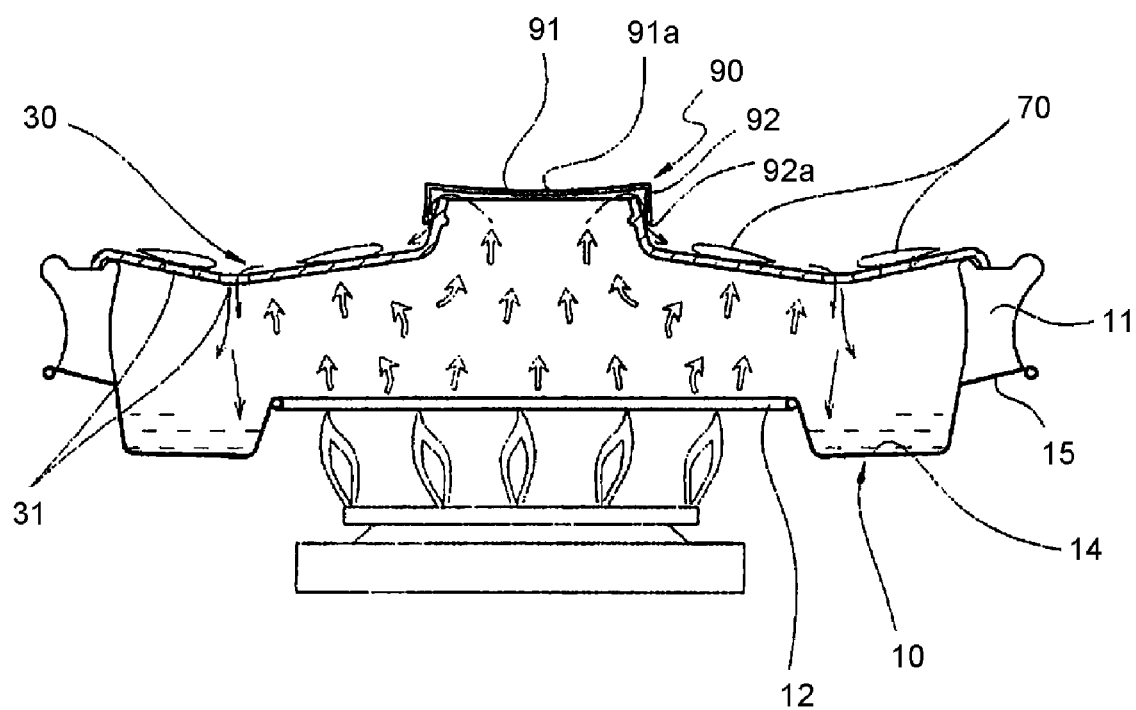
FIG. 3b is a cross-sectional view of another conventional cooker.
Figure 4:
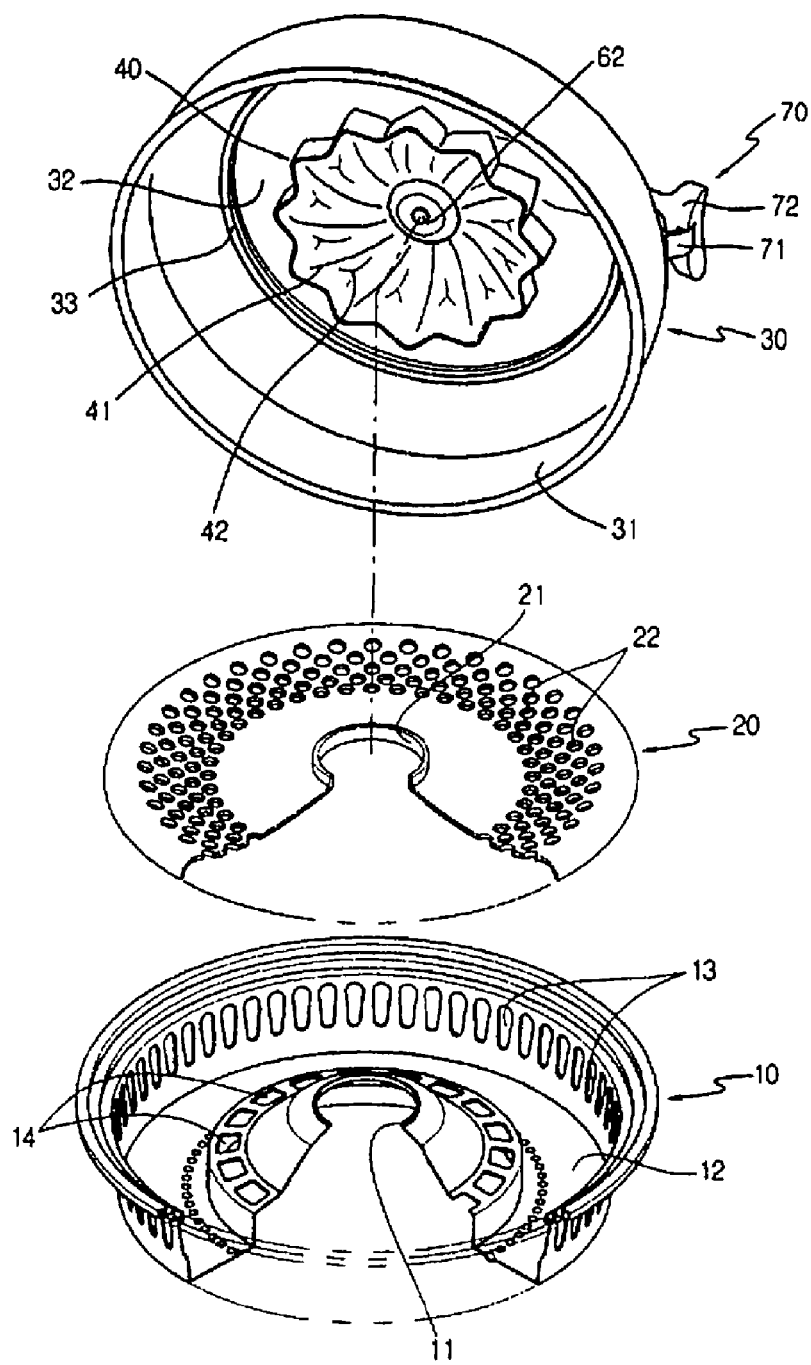
FIG. 4 is an exploded perspective view of a portable cooking system according to an embodiment of the invention.
Figure 5A:
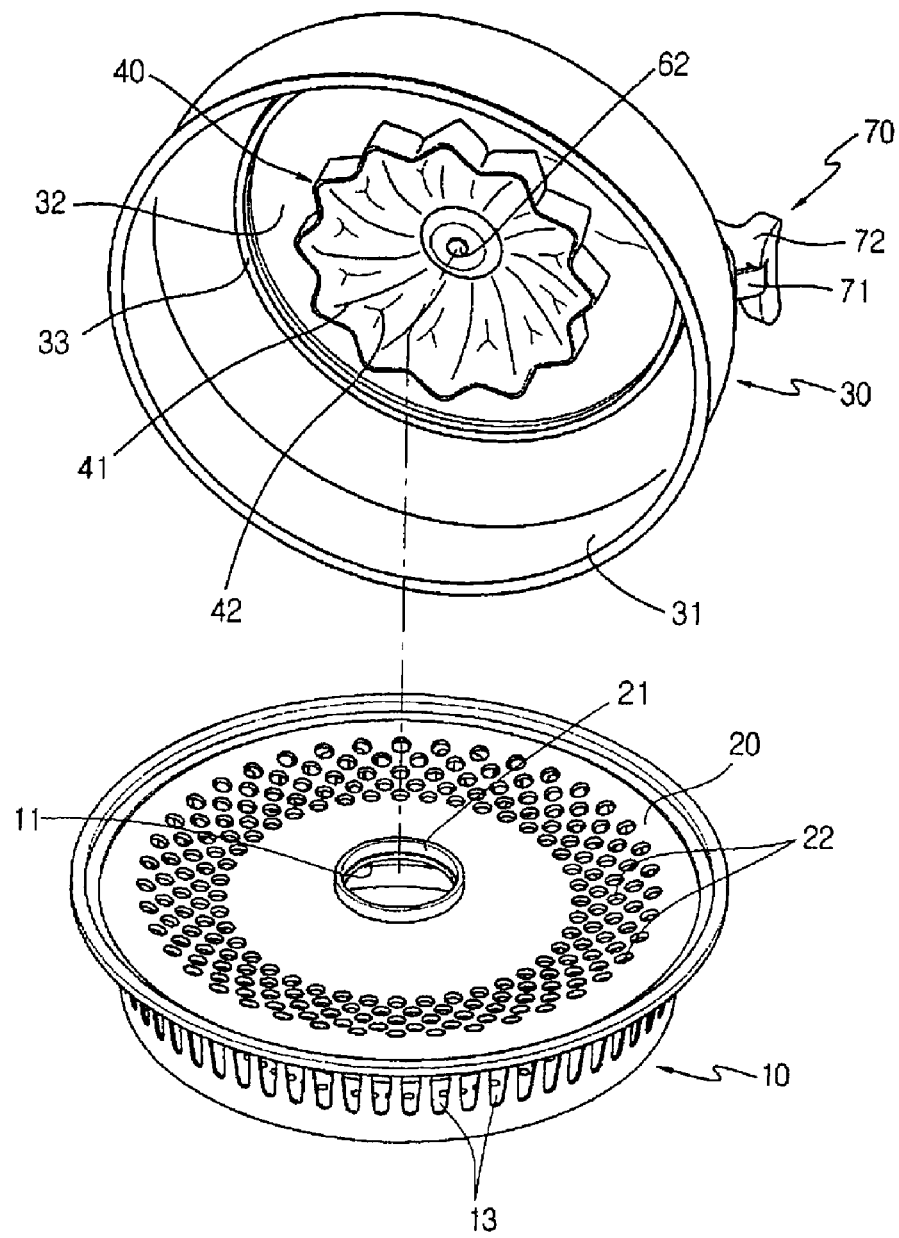
FIG. 5a is a perspective view showing a portable cooking system according to an embodiment of the present invention with a lid opened.
Figure 5B:
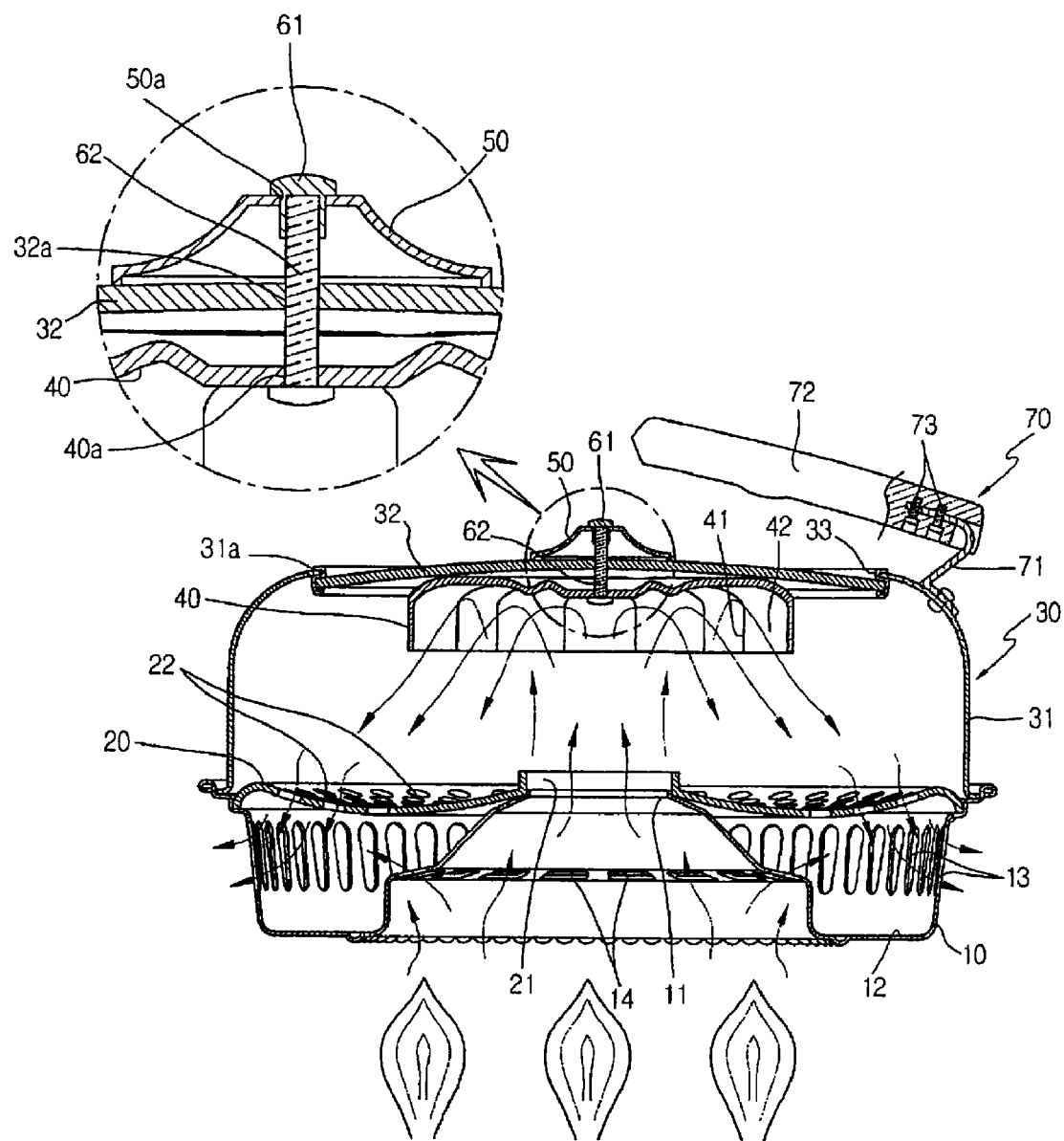
FIG. 5b is a cross-sectional view showing a portable cooking system according to an embodiment of the present invention.
Figure 5C:
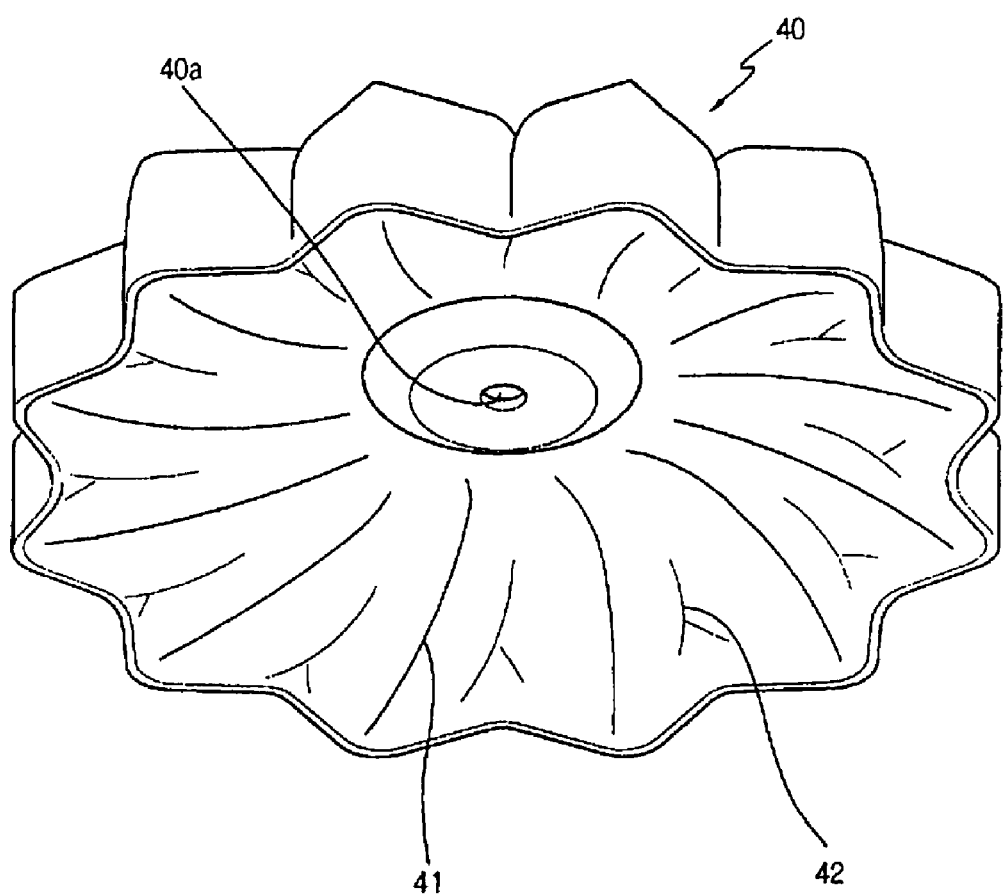
FIG. 5c is a perspective view showing a reflector of the present invention.
Figure 6:
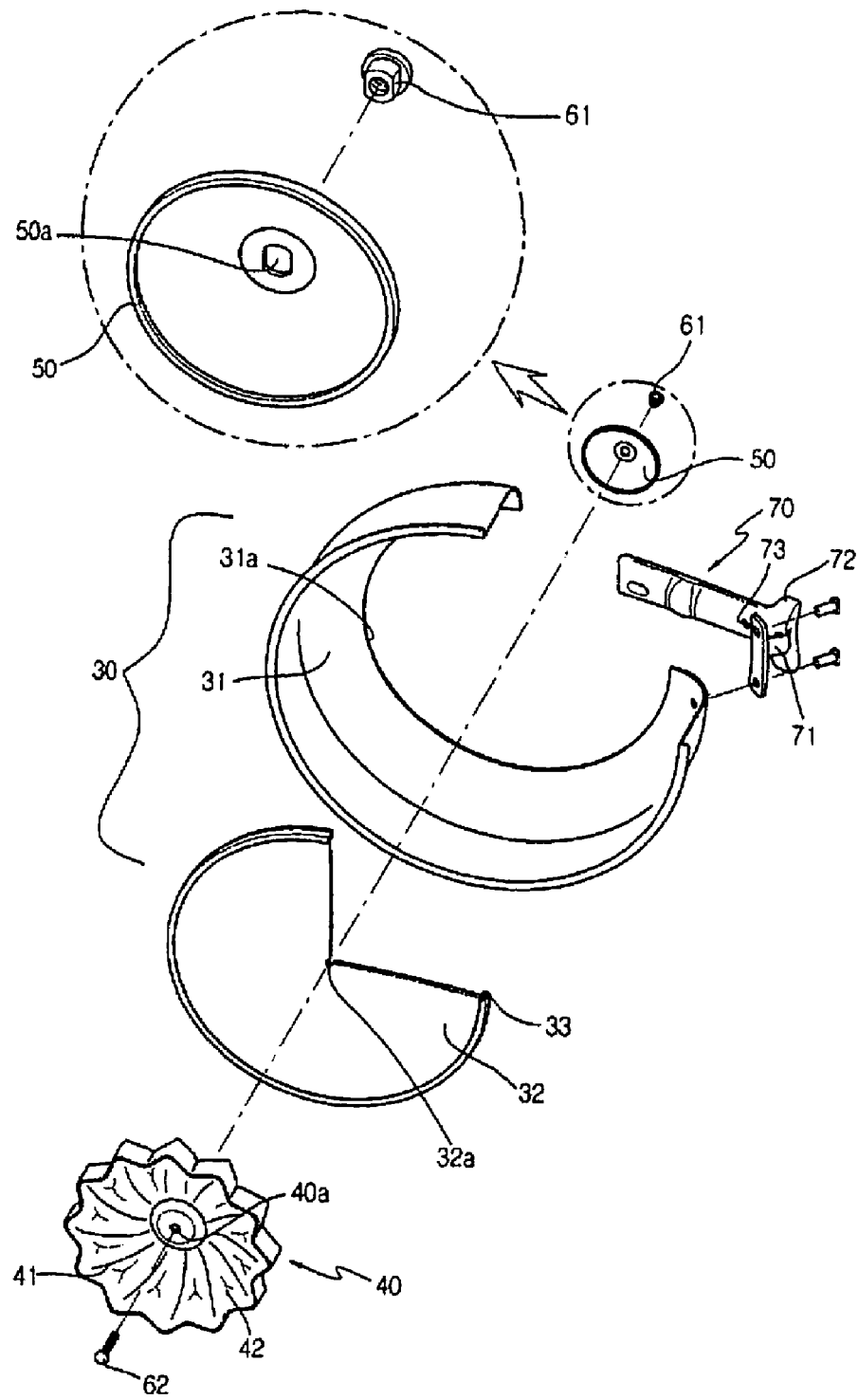
FIG. 6 is an exploded perspective view of a lid of a portable cooking system according to an embodiment of the present invention.
Figure 7:
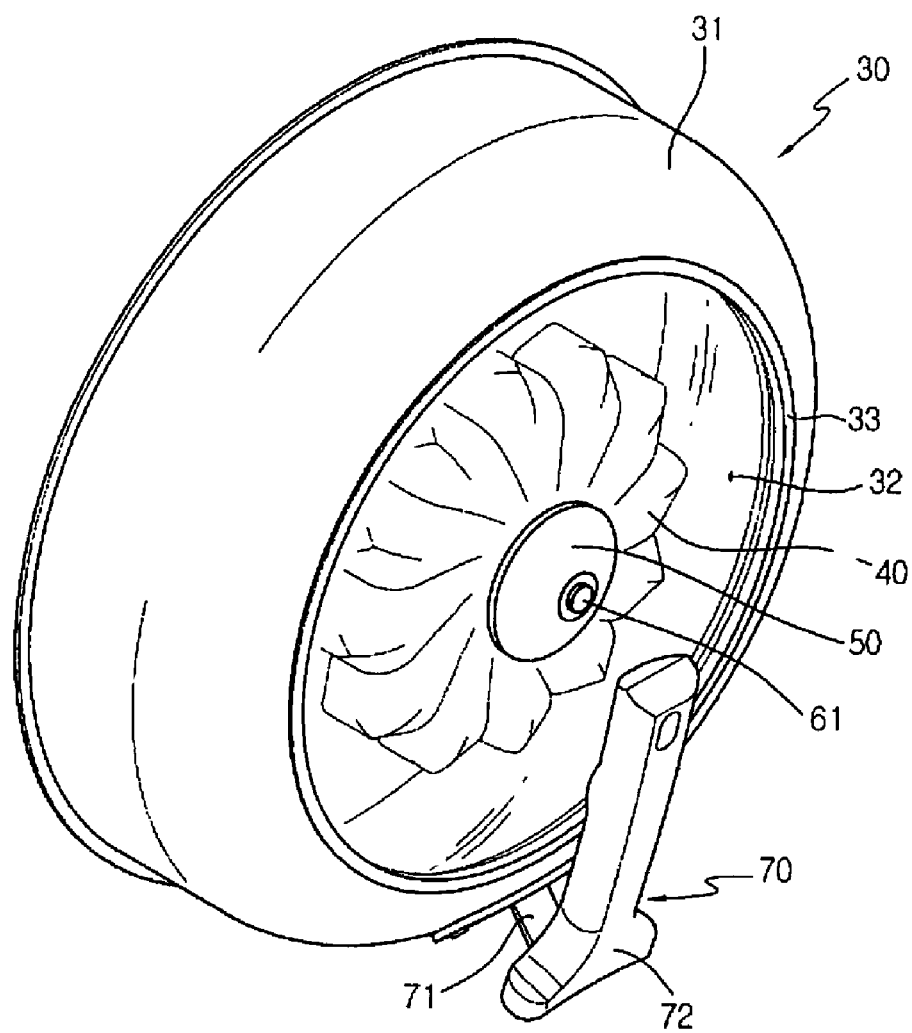
FIG. 7 is a perspective view showing a lid of a portable cooking system set on a surface vertically according to the present invention.
Figure 8A:
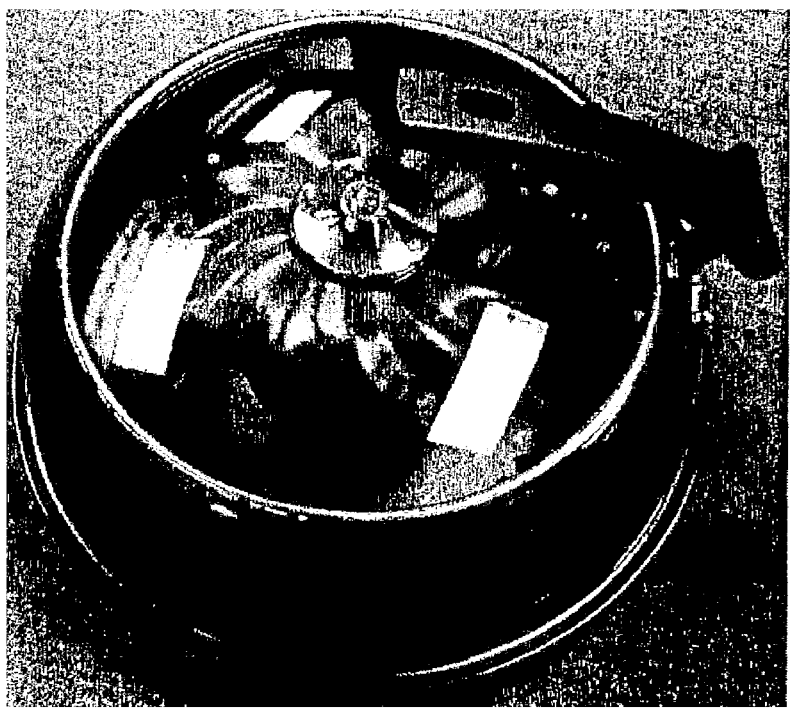
FIGS. 8a to 8c show pictures of a portable cooking system according to the present invention.
Figure 8B:
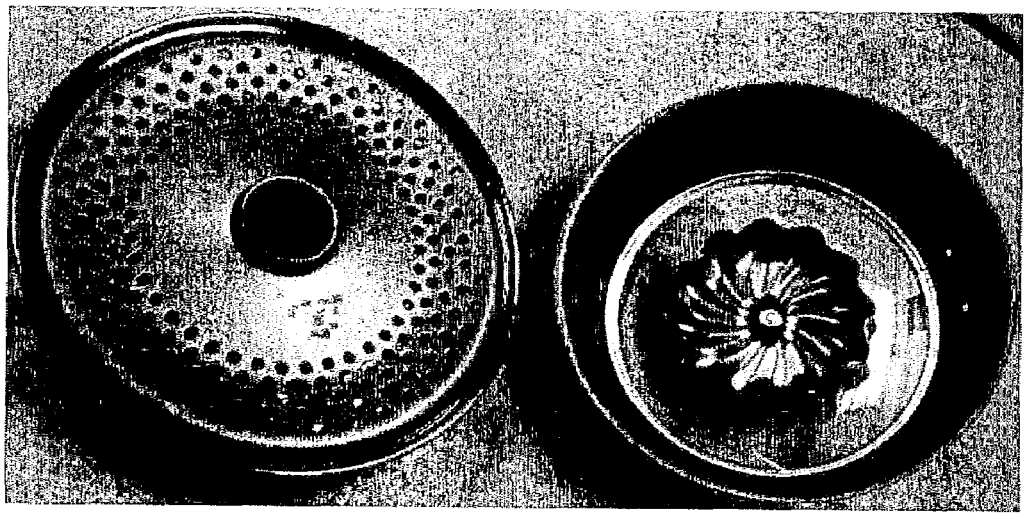
Figure 8C:
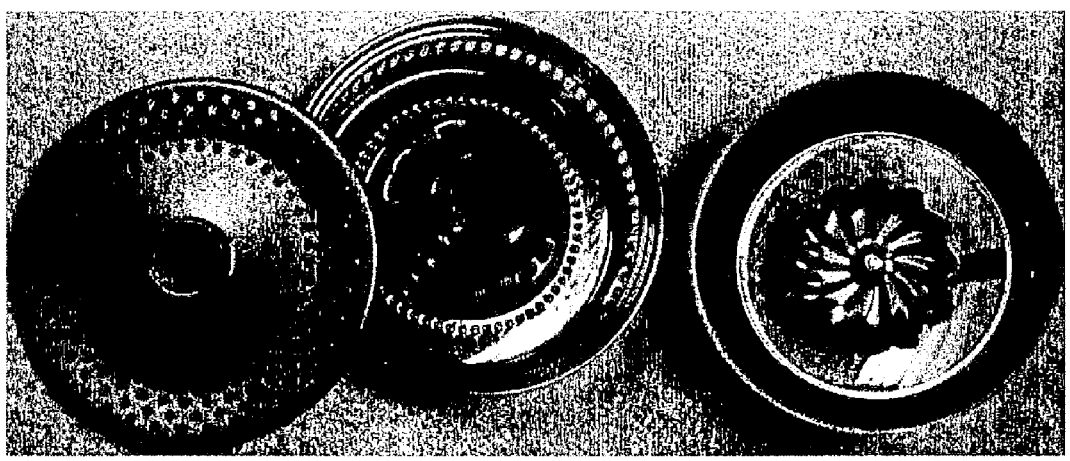

The base tray 10 comprises a heating through hole 11 and a basin 12 provided at a bottom of the base tray 10 and around the heating through hole 11. The heating through hole 11 is adapted for guiding heating airflow therethrough, and the basin 12 is adapted to collect liquid falling down from above. In certain embodiments, the base tray 10 may have a circular tray with a raised hole at the center like a sliced dough-nut as shown in FIG. 4.

The grill plate 20 comprises a central opening 21, a substantially annular surface, and a plurality of drain holes 22 in the annular surface, and the grill plate 20 is configured to sit tightly on the base tray 10. In certain embodiments, the top surface profile is determined such that the food stuff for cooking is rested stably and oil or fatty liquid smeared from the food stuff is collected in the middle portion of the annular grill plate 20. Also, the surface portions close to the central opening 21 may not include the drain holes 22 in order to prevent the oil or fatty liquid from dropping down to other parts than the basin 12 of the base tray 10. Auxiliary holes 14 (introduced below) may be protected by this surface portions without the drain holes 22.

The lid 30 is to cover the grill plate 20. In certain embodiments, the lid 30 is fitted into the base tray 10 reasonably air-tightly for keeping the hot air inside the portable cooking system and guiding them to the prepared ventilation holes 13, 14 (introduced below).

The reflector 40 of an upturned concave bowl shape comprises a plurality of radial furrows 41, and a plurality of radial ridges 42 alternatively disposed between the plurality of radial furrows 41, and the reflector 40 is attached to a ceiling portion of the lid 30.

At least some of the plurality of radial furrows 41 and the plurality of ridges 42 are disposed on an inner surface of the upturned concave bowl shape generally in radiating directions, such that the heating airflow that rise upward through the heating through hole 11 and the central opening 21 of the grill plate 20 and hit a center portion of the reflector 40 are guided outwardly along the generally radiating directions to reach substantially evenly over to the grill plate 20. In certain embodiments, the shape or distribution of the plurality of radial furrows 41 and the plurality of ridges 42 are determined to disperse the heating hot air all over the cooking space on the grill plate 20. By controlling the shape or distribution of the plurality of radial furrows 41 and the plurality of ridges 42, the heating hot air can be formed a whirlwind movement or turbulent flow, which enhances the dispersion of the flow.

The reflector 40 may comprise a cross-sectional profile configured for delivering the heating airflows evenly to the annular surface of the grill plate 20.

The cross-sectional profile of the upturned concave shape may have a locally lowest point at a center, rises as the distance from the center increases to reach a highest point about at a mid point, and falls to a lowest point at an edge.

The cross-sectional profile of the upturned concave shape may have one or more fluctuations with local minimum or maximum points.

Each of the one or more fluctuations with local minimum or maximum points may be configured to deliver the heating airflows to a different portion of the annular surface of the grill plate 20.

The plurality of radial furrows 41 and radial ridges 42 may comprise a plurality of whirlwind pattern.

The plurality of radial ridges 42 may be distributed evenly around the center of the reflector 40.

The lid 30 may comprise a metal body 31 and a glass cover 32 disposed on a top hole 31a of the metal body 31.

The lid 30 further may comprise a fastening ring 33 for fixing the glass cover 32 in the top hole 31a.

The reflector 40 may be attached to the lid 30 with a mechanical fastener, and the mechanical fastener comprises: a top fastening hole 32a provided in a center of the glass cover 32; a bottom fastening hole 40a provided in the center of the reflector 40; a supporting plate 50 configured to cover a portion of the glass cover 32 and comprising an elliptical hole 50a; an elliptical nut 61 configured to be installed in the elliptical hole 50a; and a bolt configured to engage the elliptical nut 61 through the top and bottom fastening holes 32a, 40a.

The portable cooking system may further comprise a handle 70. The handle 70 may extend from a side portion of the lid 30 toward a center of the lid 30, and a supporting portion of the handle 70 may be aligned with a side portion of the lid 30, such that the lid 30 stands substantially vertically on the supporting portion of the handle 70 and the side portion of the lid 30.

The handle 70 may further comprise a fixing member 71 for attaching the handle 70 to the side portion of the lid 30, a gripping portion 72 extending toward the center of the lid 30, and a mechanical fastener 73 for connecting the fixing member 71 and the gripping portion 72.

The drain holes 22 of the grill plate 20 may be disposed concentrically and substantially evenly in an axial direction.

The drain holes 22 may be configured to drop liquid on the grill plate 20 down to the basin 12.

The base tray 10 may comprise a plurality of ventilation holes 13 on outer side walls.

The base tray 10 may further comprise a plurality of auxiliary holes 14 disposed between the basin 12 and the heating through hole 11.

The plurality of ventilation holes 13 may be disposed substantially vertically, and the plurality of auxiliary holes 14 are disposed substantially horizontally.

The heating through hole 11 may be fitted into the central opening 21 of the grill plate 20.

In certain embodiments of the present invention, the reflector 40 is circumferentially toothed to form outward peaks and inward troughs, wherein the outward peaks correspond to the ridges 42 and the inward troughs correspond to the furrows 41.

For the present invention shown and described with reference to different embodiments thereof, variations in form, detail, compositions and operation may be made without departing from the spirit and scope of the present invention as defined by the accompanying claims.

What is claimed is:

1. A portable cooking system, comprising:
    a grill plate comprising a central opening, a substantially annular surface, and a plurality of drain holes in the annular surface;
    a lid to cover the grill plate; and
    a reflector of an upturned bowl shape, comprising a plurality of furrows, and a plurality of ridges alternatively disposed between the furrows, wherein the reflector is attached to a ceiling portion of the lid, wherein the furrows and ridges are radially formed along an inner surface of the upturned bowl shape, and
    a base tray comprising a heating through hole and a basin, the basin being provided at a bottom of the base tray and around the heating through hole, wherein the heating through hole is adapted for guiding heating airflow therethrough, and wherein the basin is adapted to collect liquid falling down, wherein the grill plate is configured to sit on the base tray,
    wherein the cross-sectional profile of the upturned bowl shape has a locally lowest point at a center of the profile, rises as the distance from the center increases toward a highest point of the profile, and falls to a lowest point at an edge of the profile.

2. The portable cooking system of claim 1, wherein the reflector comprises a cross-sectional profile configured to deliver the heating airflow evenly to the annular surface of the grill plate.

3. The portable cooking system of claim 1, wherein the cross-sectional profile of the upturned bowl shape has one or more fluctuations with locally minimum or maximum points.

4. The portable cooking system of claim 3, wherein each of the one or more fluctuations with the locally minimum or maximum points is configured to deliver the heating airflow to a different portion of the annular surface of the grill plate.

5. The portable cooking system of claim 1, wherein the plurality of furrows and ridges comprise a plurality of whirlwind patterns.

6. The portable cooking system of claim 5, wherein the plurality of ridges are distributed evenly around the center of the reflector.

7. The portable cooking system of claim 1, wherein the lid comprises a metal body and a glass cover disposed on a top hole of the metal body.

8. The portable cooking system of claim 7, wherein the lid further comprises a fastening ring for fixing the glass cover in the top hole.

9. The portable cooking system of claim 8, wherein the reflector is attached to the lid with a mechanical fastener, and wherein the mechanical fastener comprises:
    a top fastening hole provided in a center of the glass cover;
    a bottom fastening hole provided in the center of the reflector;
    a supporting plate configured to cover a portion of the glass cover and comprising an elliptical hole;
    an elliptical nut configured to be installed in the elliptical hole; and
    a bolt configured to engage the elliptical nut through the top and bottom fastening holes.

10. The portable cooking system of claim 1, further comprising a handle, wherein the handle extends from a side portion of the lid toward a center of the lid, and wherein a supporting portion of the handle is aligned with a side portion of the lid, such that the lid stands substantially vertically on the supporting portion of the handle and the side portion of the lid.

11. The portable cooking system of claim 10, wherein the handle further comprises a fixing member for attaching the handle to the side portion of the lid, a gripping portion extending toward the center of the lid, and a mechanical fastener for connecting the fixing member and the gripping portion.

12. The portable cooking system of claim 1, wherein the drain holes of the grill plate are disposed concentrically and substantially evenly along an axial direction.

13. The portable cooking system of claim 12, wherein the drain holes are configured to drop liquid on the grill plate down to the basin.

14. The portable cooking system of claim 1, wherein the base tray comprises a plurality of ventilation holes in outer side walls.

15. The portable cooking system of claim 14, wherein the base tray further comprises a plurality of auxiliary holes disposed between the basin and the heating through hole.

16. The portable cooking system of claim 15, wherein the plurality of ventilation holes are disposed substantially vertically, and wherein the plurality of auxiliary holes are disposed substantially horizontally.

17. The portable cooking system of claim 1, wherein the heating through hole is fitted into the central opening of the grill plate.

18. The portable cooking system of claim 1, wherein the reflector is circumferentially toothed to form outward peaks and inward troughs, wherein the outward peaks correspond to the ridges and the inward troughs correspond to the furrows.

* * * * *